(12) United States Patent
Kim et al.

(10) Patent No.: US 11,034,246 B2
(45) Date of Patent: Jun. 15, 2021

(54) WIRELESS COMMUNICATION METHOD AND APPARATUS FOR WIRELESS POWER TRANSFER TO ELECTRIC VEHICLE

(71) Applicants: Hyundai Motor Company, Seoul (KR); Kia Motors Corporation, Seoul (KR)

(72) Inventors: Zeung Il Kim, Gyeonggi-do (KR); Byung Seung Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 428 days.

(21) Appl. No.: 16/043,552

(22) Filed: Jul. 24, 2018

(65) Prior Publication Data
US 2019/0023140 A1 Jan. 24, 2019

(30) Foreign Application Priority Data

Jul. 24, 2017 (KR) .................. 10-2017-0093710
Jun. 27, 2018 (KR) .................. 10-2018-0073753

(51) Int. Cl.
| | | |
|---|---|---|
| *B60L 11/18* | (2006.01) | |
| *H02J 7/02* | (2016.01) | |
| *H02J 50/12* | (2016.01) | |
| *B60L 53/38* | (2019.01) | |
| *B60L 53/126* | (2019.01) | |
| *B60L 53/65* | (2019.01) | |
| *B60L 53/68* | (2019.01) | |
| *H02J 50/80* | (2016.01) | |
| *B60L 53/12* | (2019.01) | |

(52) U.S. Cl.
CPC ............ *B60L 11/1829* (2013.01); *B60L 53/12* (2019.02); *B60L 53/126* (2019.02); *B60L 53/38* (2019.02); *B60L 53/65* (2019.02); *B60L 53/68* (2019.02); *H02J 7/025* (2013.01); *H02J 50/12* (2016.02); *H02J 50/80* (2016.02)

(58) Field of Classification Search
CPC ....................................................... H02J 7/00
See application file for complete search history.

(56) References Cited

U.S. PATENT DOCUMENTS

2016/0064994 A1\* 3/2016 Ku ................ H04B 5/0037
307/104

\* cited by examiner

*Primary Examiner* — Robert Grant
(74) *Attorney, Agent, or Firm* — Mintz Levin Cohn Ferris Glovsky and Popeo, P.C.; Peter F. Corless

(57) ABSTRACT

A wireless communication method for wireless power transfer (WPT) to an electric vehicle (EV) may include: transmitting, by a wireless charging control apparatus equipped in the EV, a probe request frame to a charging station, the probe request frame including identification information of an access point (AP) pre-stored in the wireless charging control apparatus; receiving, at the wireless charging control apparatus, a probe response frame from the charging station corresponding to the identification information; performing, by the wireless charging control apparatus, authentication for wireless connection initialization by transmitting first authentication information to the charging station; and after the authentication for the wireless connection initialization is completed, performing, by the wireless charging control apparatus, user authentication for WPT using second authentication information pre-stored in the wireless charging control apparatus.

18 Claims, 7 Drawing Sheets

WIRELESS COMMUNICATION METHOD AND APPARATUS FOR WIRELESS POWER TRANSFER TO ELECTRIC VEHICLE

CROSS-REFERENCE TO RELATED APPLICATIONS

The present application claims the benefit of priority to Korean Patent Application No. 10-2017-0093710, filed on Jul. 24, 2017 in the Korean Intellectual Property Office (KIPO), and Korean Patent Application No. 10-2018-0073753, filed on Jun. 27, 2018 in the KIPO, the entire contents of which are incorporated herein by reference.

TECHNICAL FIELD

The present disclosure relates to a wireless communication method and an apparatus using the same for wireless power transfer (WPT) to an electric vehicle (EV) and, more specifically, to a wireless communication method and an apparatus using the same for WPT to an EV based on pre-stored authentication information.

BACKGROUND

An electric vehicle (EV) charging system may be defined as a system for charging a high-voltage battery mounted in an EV using power of an energy storage device (e.g., a battery) or the power grid of a commercial power source. The EV charging system may have various forms according to the type of EV. For example, the EV charging system may be classified into a conductive-type using a charging cable or a non-contact wireless power transfer-type (also referred to as an "inductive-type").

With regard to the latter type of system, when charging an EV wirelessly, a reception coil in a vehicle assembly (VA) mounted in the EV forms an inductive resonant coupling with a transmission coil in a group assembly (GA) located in a charging station or a charging spot. Electric power is then transferred from the GA to the VA to charge the high-voltage battery of the EV through the inductive resonant coupling.

Among various wireless communication protocols, the IEEE 802.11 communication protocol (referred to also as Wireless Fidelity (WiFi)) is often used as a main communication scheme for wireless power transfer (WPT) between the EV and the charging station. However, it is required for a user (e.g., an owner or a user of the EV) to input a security scheme and authentication information (e.g., a password) for wireless connection initialization at least once in order to access an access point (AP) which is the charging station itself or mounted on the charging station.

Therefore, it is necessary that an input device (e.g., an Audio/Video/Navigation (AVN) apparatus or a vehicle infotainment system) for inputting the authentication information is equipped in the EV. However, many vehicles are not equipped with such an input device.

SUMMARY

Embodiments of the present disclosure provide a wireless communication method for WPT to an EV (EV WPT). Embodiments of the present disclosure also provide a wireless charging control apparatus which is equipped in an EV and performs the wireless communication method for EV WPT.

According to embodiments of the present disclosure, a wireless communication method for WPT to an EV, performed in a wireless charging control apparatus equipped in the EV, may include: transmitting, by a wireless charging control apparatus equipped in the EV, a probe request frame to a charging station, the probe request frame including identification information of an access point (AP) pre-stored in the wireless charging control apparatus; receiving, at the wireless charging control apparatus, a probe response frame from the charging station corresponding to the identification information; performing, by the wireless charging control apparatus, authentication for wireless connection initialization by transmitting first authentication information to the charging station; and after the authentication for the wireless connection initialization is completed, performing, by the wireless charging control apparatus, user authentication for WPT using second authentication information pre-stored in the wireless charging control apparatus.

The wireless communication method may further include, before the transmitting of the probe request frame, detecting, by the wireless charging control apparatus, completion of alignment between a reception pad equipped in the EV and a transmission pad operatively coupled to the charging station.

The identification information of the AP may be a unique service set identifier (SSID) of an AP provided by a charging service provider for the EV.

The wireless communication method may further include downloading and storing, by the wireless charging control apparatus, the second authentication information from a server of a charging service provider prior to the transmitting of the probe request frame.

The second authentication information may include at least one of an identification (ID) of a user of the EV, a password of the user of the EV, and a medium access control (MAC) address of the wireless charging control apparatus.

The performing of the authentication for the wireless connection initialization may include: generating, by the wireless charging control apparatus, authentication password information based on a MAC address of the wireless charging control apparatus; and transmitting, by the wireless charging control apparatus, an authentication request frame including the generated authentication password information to the charging station.

The performing of the authentication for the wireless connection initialization may include: obtaining, by the wireless charging control apparatus, a smart key signal from a body control module of the EV; generating, by the wireless charging control apparatus, authentication password information by altering the obtained smart key signal; and transmitting, by the wireless charging control apparatus, an authentication request frame to the charging station, the authentication request frame including the generated authentication password information.

The wireless communication method may further include, after the performing of the user authentication, the wireless charging control apparatus being assigned an Internet Protocol (IP) address by the charging station.

The wireless communication method may further include, after being assigned the IP address, generating and storing, by the wireless charging control apparatus, profile data including information for the wireless connection initialization.

The performing of the authentication for the wireless connection initialization may include transmitting, by a reception pad of the EV, an authentication request message to a transmission pad of the charging station in a magnetic communication manner, the authentication request message including the first authentication information.

Furthermore, in accordance with embodiments of the present disclosure, a wireless charging control apparatus equipped in an EV may comprise at least one processor and a memory storing at least one program instruction, which when executed by the at least one processor may cause the at least one processor to be configured to: transmit, to a charging station, a probe request frame including identification information of an access point (AP) pre-stored in the wireless charging control apparatus; receive a probe response frame from the charging station corresponding to the identification information; perform authentication for wireless connection initialization by transmitting first authentication information to the charging station; and after the authentication for the wireless connection initialization is completed, perform user authentication for wireless power transfer (WPT) using second authentication information pre-stored in the wireless charging control apparatus.

The at least one processor may be further configured to, before the transmission of the probe request frame, detect completion of alignment between a reception pad equipped in the EV and a transmission pad operatively coupled to the charging station.

The identification information of the AP is a unique service set identifier (SSID) of an AP provided by a charging service provider for the EV.

The wireless charging control apparatus may further include a non-volatile memory (NVRAM). The at least one processor may be further configured to download the second authentication information from a server of a charging service provider prior to the transmission of the probe request frame, and the NVRAM may be configured to store the second authentication information prior to the transmission of the probe request frame.

The second authentication information may include at least one of an identification (ID) of a user of the EV, a password of the user of the EV, and a medium access control (MAC) address of the wireless charging control apparatus.

The at least one processor may be further configured to generate authentication password information based on a MAC address of the wireless charging control apparatus; and transmit an authentication request frame including the generated authentication password information to the charging station.

The at least one processor may be further configured to obtain a smart key signal from a body control module of the EV; generate authentication password information by altering the obtained smart key signal; and transmit an authentication request frame to the charging station, the authentication request frame including the generated authentication password information.

The wireless charging control apparatus may be assigned an Internet Protocol (IP) address by the charging station after the performance of the user authentication.

The at least one processor may be further configured to, after the wireless charging control apparatus being assigned the IP address, generate and store profile data including information for the wireless connection initialization.

In the performing authentication for wireless connection initialization, the at least one instruction may be further configured to transmit an authentication request message including the first authentication information from a reception pad of the EV to a transmission pad of the charging station in a magnetic communication manner.

A reception pad of the EV may transmit an authentication request message to a transmission pad of the charging station in a magnetic communication manner, the authentication request message including the first authentication information.

BRIEF DESCRIPTION OF DRAWINGS

Embodiments of the present disclosure will become more apparent by describing in detail embodiments of the present disclosure with reference to the accompanying drawings, in which.

Figure 1:
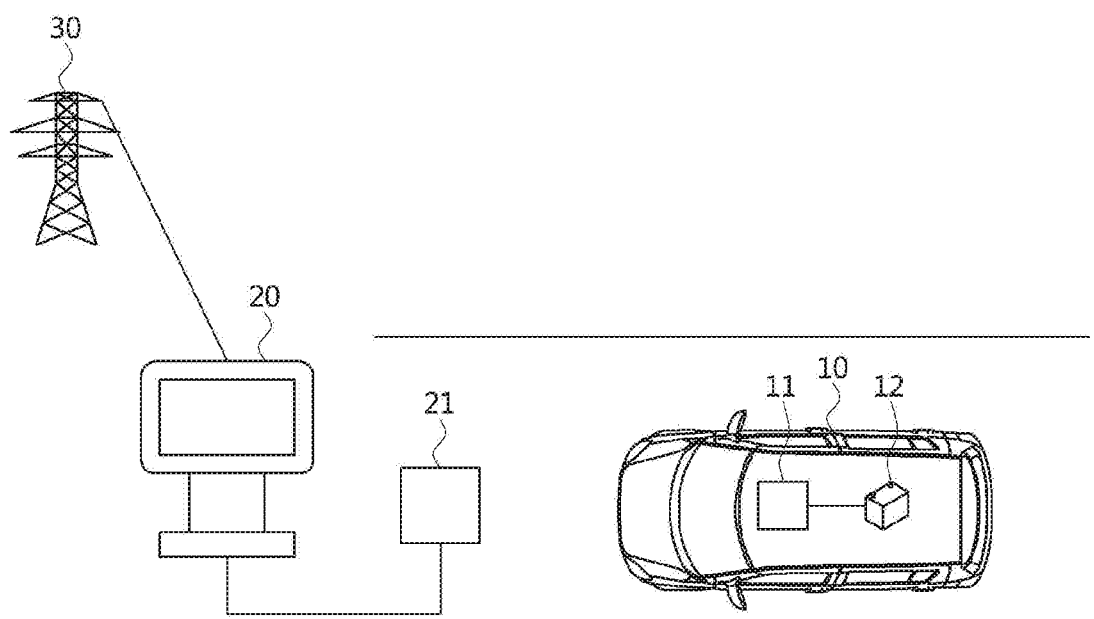
FIG. 1 is a conceptual diagram illustrating a concept of a wireless power transfer (WPT) to which embodiments of the present disclosure are applied.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

In accordance with embodiments of the present disclosure, an EV charging system may be defined as a system for charging a high-voltage battery equipped in an EV by using power of an energy storage device (e.g., a battery) or the power grid of a commercial power source. The EV charging system may have various forms according to the type of EV. For example, the EV charging system may be classified into a conductive-type using a charging cable and a non-contact WPT-type (also referred to as an "inductive-type"). Furthermore, a power source may include a residential or public electrical service, a generator utilizing vehicle fuel, or the like.

Terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An Electric Vehicle that recharges the on-vehicle primary battery by connecting to the power grid.

"Plug-in vehicle (PV)": An electric vehicle rechargeable through wireless charging from an electric vehicle supply equipment (EVSE) without using a physical plug or a physical socket.

"Heavy duty vehicle (H.D. Vehicle)": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically through a two-part loosely coupled transformer.

"Wireless power transfer (WPT)": The transfer of electrical power from the AC supply network to the electric vehicle by contactless means.

"Utility": A set of systems which supply electrical energy and may include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

"Smart charging": A system in which EVSE and/or PEV communicate with power grid in order to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which components of a system interwork with corresponding components of the system in order to perform operations aimed by the system. Also, information interoperability may mean capability that two or more networks, systems, devices, applications, or components can efficiently share and easily use information without causing inconvenience to users.

"Inductive charging system": A system transferring energy from a power source to an EV through a two-part gapped core transformer in which the two halves of the transformer, primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly (VA)": An assembly on the vehicle consisting of the VA Coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA coil magnetic surface distance": the distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized in case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. Pairing may include the process by which a VA controller and a GA controller of a charging spot are correlated. The correlation/association process may include the process of establishment of a relationship between two peer communication entities.

"Command and control communication": The communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited.

"Low power excitation (LPE)": LPE means a technique of activating the primary device for the fine positioning and pairing so that the EV can detect the primary device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is the name of the network to which one desires to connect. It is similar to SSID but can be a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller configured to manage the at least one GA. The GA may comprise at least one wireless communication device. The charging station may mean a place having at least one GA, which is installed in home, office, public place, road, parking area, etc.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, or the like, as described herein. Moreover, it is understood that the below methods may be executed by an apparatus comprising the controller in conjunction with one or more other components, as would be appreciated by a person of ordinary skill in the art.

In embodiments of the present disclosure, a light load driving or light load operation may include, for example, charging a high voltage battery with a charging voltage lower than a predetermined rated voltage in the latter half of charging for the high voltage battery connected to the VA in the WPT system. Also, the light load operation may include a case in which the high-voltage battery of EV is charged at a relatively low voltage and at a low speed by using a low-speed charger such as a household charger.

Hereinafter, embodiments of the present disclosure will be explained in detail with reference to accompanying figures.

FIG. 1 is a conceptual diagram illustrating a concept of a wireless power transfer (WPT) to which embodiments of the present disclosure are applied.

As shown in FIG. 1, a WPT may be performed by at least one component of an electric vehicle (EV) 10 and a charging station 20, and may be used for wirelessly transferring power to the EV 10.

Herein, the EV 10 may be defined as a vehicle supplying an electric power stored in a rechargeable energy storage including a battery 12 as an energy source of an electric motor which is a power train system of the EV 10.

However, the EV 10 according to embodiments of the present disclosure may include a hybrid electric vehicle (HEV) having an electric motor and an internal combustion engine together, and may include not only an automobile but also a motorcycle, a cart, a scooter, an electric bicycle, or the like.

Also, the EV 10 may include a power reception pad 11 including a reception coil for charging the battery 12 wirelessly and may include a plug connection for conductively charging the battery 12. Here, the EV 10 configured for conductively charging the battery 12 may be referred to as a plug-in electric vehicle (PEV).

The charging station 20 may be connected to a power grid 30 or a power backbone, and may provide an alternating current (AC) power or a direct current (DC) power to a power transmission pad 21 including a transmission coil through a power link.

Also, the charging station 20 may communicate with an infrastructure management system or an infrastructure server that manages the power grid 30 or a power network through wired/wireless communications, and performs wireless communications with the EV 10.

Herein, the wireless communications may be Bluetooth, Zigbee, cellular, wireless local area network (WLAN), or the like.

Also, for example, the charging station 20 may be located at various places including a parking area attached to the owner's house of the EV 10, a parking area for charging an EV at a gas station, a parking area at a shopping center or a workplace.

A process of wirelessly charging the battery 12 of the EV 10 may begin with first placing the power reception pad 11 of the EV 10 in an energy field generated by the power transmission pad 21, and making the reception coil and the transmission coil be interacted or coupled with each other. An electromotive force may be induced in the power reception pad 11 as a result of the interaction or coupling, and the battery 12 may be charged by the induced electromotive force.

The charging station 20 and the transmission pad 21 may be referred to as a ground assembly (GA) in whole or in part, where the GA may refer to the previously defined meaning.

All or part of the internal components and the reception pad 11 of the EV 10 may be referred to as a vehicle assembly (VA), in which the VA may refer to the previously defined meaning.

The power transmission pad or the power reception pad may be configured to be non-polarized or polarized.

In a case that a pad is non-polarized, there is one pole in a center of the pad and an opposite pole in an external periphery. A flux may be formed to exit from the center of the pad and return at all to external boundaries of the pad.

If the pad is polarized, it may have a respective pole at either end portion of the pad. Here, a magnetic flux may be formed based on an orientation of the pad.

Figure 2:
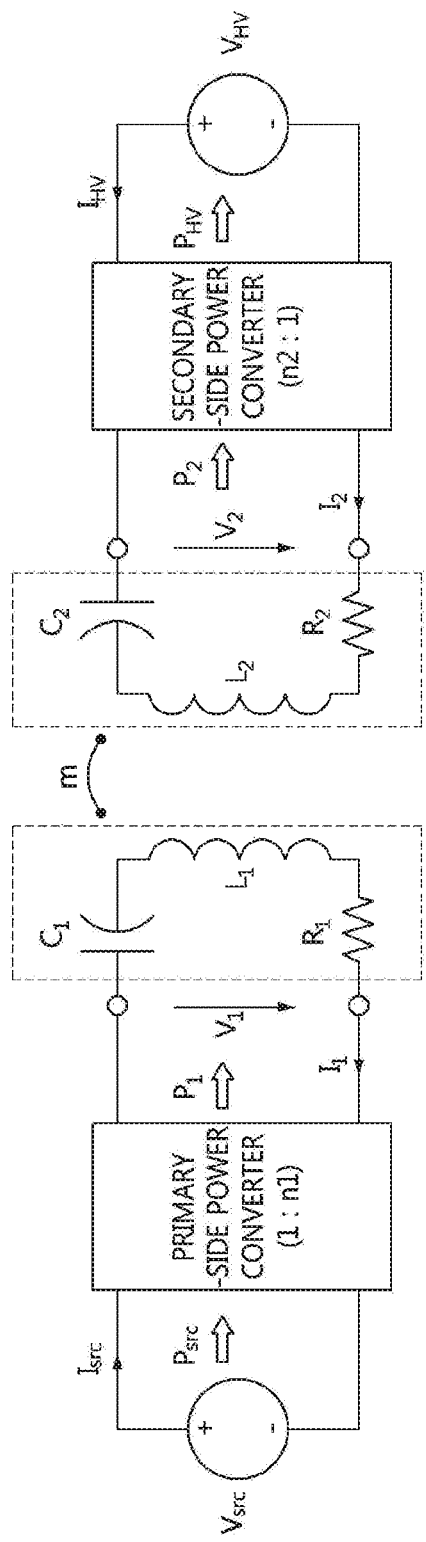
FIG. 2 is a conceptual diagram illustrating a WPT circuit according to embodiments of the present disclosure.

FIG. 2 is a conceptual diagram illustrating a WPT circuit according to embodiments of the present disclosure.

As shown in FIG. 2, a schematic configuration of a circuit in which WPT is performed in a system for WPT of an EV (hereinafter "EV WPT") may be seen.

The left side of FIG. 2 may be interpreted as expressing all or part of a power source $V_{src}$ supplied from the power network, the charging station 20, and the transmission pad 21 in FIG. 1, and the right side of FIG. 2 may be interpreted as expressing all or part of the EV including the reception pad and the battery.

First, the left side circuit of FIG. 2 may provide an output power $P_{src}$ corresponding to the power source $V_{src}$ supplied from the power network to a primary-side power converter. The primary-side power converter may supply an output power $P_1$ converted from the output power $P_{src}$ through frequency-converting and AC-to-DC/DC-to-AC converting to generate an electromagnetic field at a desired operating frequency in a transmission coil $L_1$.

Specifically, the primary-side power converter may include an AC/DC converter for converting the power $P_{src}$ which is an AC power supplied from the power network into a DC power, and a low frequency (LF) converter for converting the DC power into an AC power having an operating frequency suitable for wireless charging. For example, the operating frequency for wireless charging may be determined to be within 80 to 90 kHz.

The power $P_1$ output from the primary-side power converter may be supplied again to a circuit including the transmission coil $L_1$, a first capacitor $C_1$ and a first resistor $R_1$. A capacitance of the first capacitor $C_1$ may be determined as a value to have an operating frequency suitable for charging together with the transmission coil $L_1$. The first resistor $R_1$ may represent a power loss occurred by the transmission coil $L_1$ and the first capacitor $C_1$.

Further, the transmission coil $L_1$ may be made to have electromagnetic coupling, which is defined by a coupling coefficient m, with the reception coil $L_2$ so that a power $P_2$ is transmitted, or the power $P_2$ is induced in the reception coil $L_2$. Therefore, the meaning of power transfer within the present disclosure may be used together with the meaning of power induction.

Still further, the power $P_2$ induced in or transferred to the reception coil $L_2$ may be provided to a secondary-side power converter. A capacitance of a second capacitor $C_2$ may be determined as a value to have an operating frequency suitable for wireless charging together with the reception coil $L_2$, and a second resistor $R_2$ may represent a power loss occurred by the reception coil $L_2$ and the second capacitor $C_2$.

The secondary-side power converter may include an LF-to-DC converter that converts the supplied power $P_2$ of a specific operating frequency to a DC power having a voltage level suitable for the battery $V_{HV}$ of the EV.

The electric power $P_{HV}$ converted from the power $P_2$ supplied to the secondary-side power converter may be output, and the power $P_{HV}$ may be used for charging the battery $V_{HV}$ disposed in the EV.

The right side circuit of FIG. 2 may further include a switch for selectively connecting or disconnecting the reception coil $L_2$ with the battery $V_{HV}$. Resonance frequencies of the transmission coil $L_1$ and the reception coil $L_2$ may be similar or identical to each other, and the reception coil $L_2$ may be positioned near the electromagnetic field generated by the transmission coil $L_1$.

The circuit of FIG. 2 should be understood as an illustrative circuit for WPT in the EV WPT system used for embodiments of the present disclosure, and is not limited to the specific circuit illustrated in FIG. 2.

On the other hand, since power loss may increase as the transmission coil $L_1$ and the reception coil $L_2$ are located at a long distance, it may be an important factor to properly set the relative positions of the transmission coil $L_1$ and the reception coil $L_2$.

The transmission coil $L_1$ may be included in the transmission pad 21 in FIG. 1, and the reception coil $L_2$ may be included in the reception pad 11 in FIG. 1. Therefore, positioning between the transmission pad and the reception pad or positioning between the EV and the transmission pad will be described below with reference to the drawings.

Figure 3:
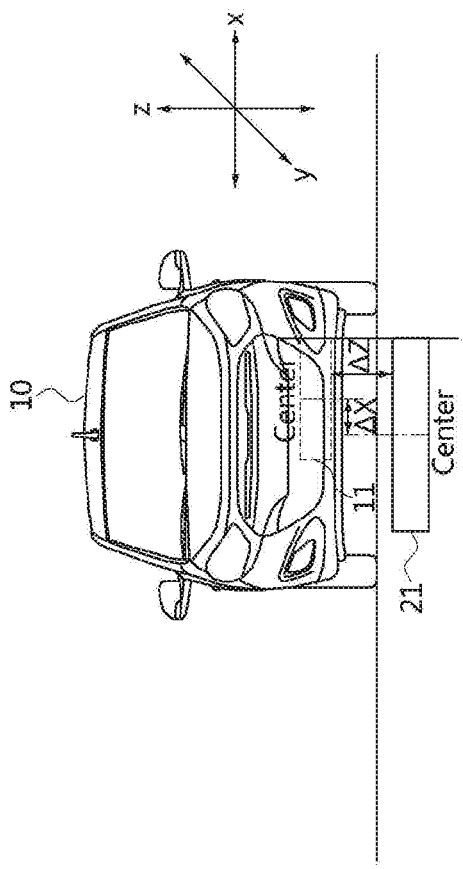
FIG. 3 is a conceptual diagram for explaining a concept of alignment in an EV WPT according to embodiments of the present disclosure.

FIG. 3 is a conceptual diagram for explaining a concept of alignment in an EV WPT according to embodiments of the present disclosure.

As shown in FIG. 3, a method of aligning the power transmission pad 21 and the power reception pad 11 in the EV in FIG. 1 will be described. Here, a positional alignment may correspond to the alignment, which is the above-mentioned term, and thus may be defined as a positional alignment between the GA and the VA, but is not limited to the alignment of the transmission pad and the reception pad.

Although the transmission pad 21 is illustrated as positioned below a ground surface as shown in FIG. 3, the transmission pad 21 may also be positioned on the ground surface, or positioned such that a top portion surface of the transmission pad 21 is exposed below the ground surface.

The reception pad 11 of the EV may be defined by different categories according to its heights (defined in the z-direction) measured from the ground surface. For example, a class 1 for reception pads having a height of 100-150 millimeters (mm) from the ground surface, a class 2 for reception pads having a height of 140-210 mm, and a class 3 for reception pads having a height of 170-250 mm may be defined. The reception pad may support a part of the above-described classes 1 to 3. For example, only the class 1 may be supported according to the type of the reception pad 11, or the class 1 and 2 may be supported according to the type of the reception pad 11.

Herein, the height of the reception pad measured from the ground surface may correspond to the previously defined term "vehicle magnetic ground clearance".

Further, the position of the power transmission pad 21 in the height direction (defined in the z-direction) may be determined to be located between the maximum class and the minimum class supported by the power reception pad 11. For example, when the reception pad supports only the class 1 and 2, the position of the power transmission pad 21 may be determined between 100 and 210 mm with respect to the power reception pad 11.

Still further, a gap between the center of the power transmission pad 21 and the center of the power reception pad 11 may be determined to be located within the limits of the horizontal and vertical directions (defined in the x- and y-directions). For example, it may be determined to be located within ±75 mm in the horizontal direction (defined in the x-direction), and within ±100 mm in the vertical direction (defined in the y-direction).

Here, the relative positions of the power transmission pad 21 and the power reception pad 11 may be varied in accordance with their experimental results, and the numerical values should be understood as exemplary.

Although the alignment between the pads is described on the assumption that each of the transmission pad 21 and the reception pad 11 includes a coil, more specifically, the alignment between the pads may mean the alignment between the transmission coil (or GA coil) and the reception coil (or VA coil) which are respectively included in the transmission pad 21 and the reception pad 11.

Figure 4:
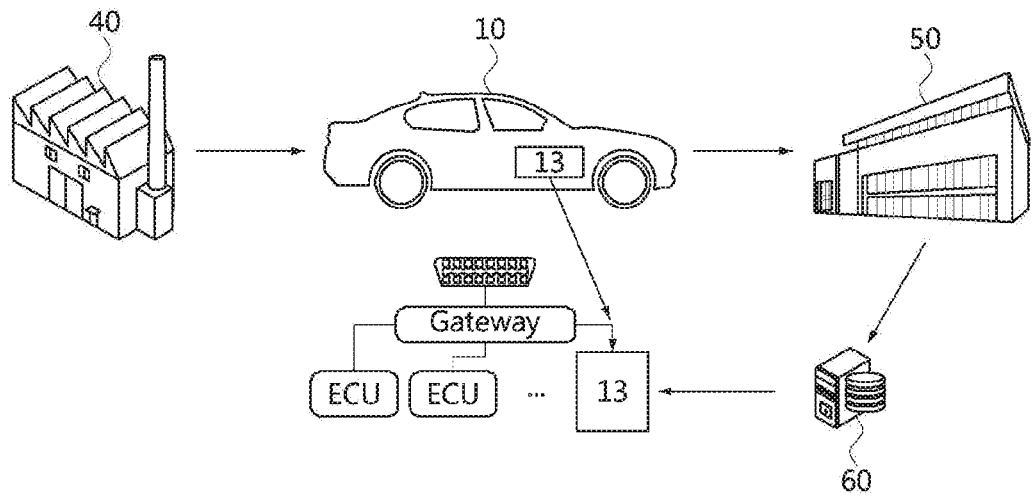
FIG. 4 is a conceptual diagram illustrating a wireless communication method for WPT to an EV according to embodiments of the present disclosure.

FIG. 4 is a conceptual diagram illustrating a wireless communication method for WPT to an EV according to embodiments of the present disclosure.

As shown in FIG. 4, a wireless communication method according to embodiments of the present disclosure may be performed in a manner that a wireless charging control apparatus 13 is equipped in the EV 10 before the EV 10 is delivered from a factory 40.

Here, the wireless charging control apparatus 13 may have a unique Medium Access Control (MAC) address, and may support authentication for WPT to the EV through a Wireless Fidelity (WiFi) communication. Also, the wireless charging control apparatus 13 may include a non-volatile memory (NVRAM), and may store authentication information in the NVRAM.

Specifically, after the EV 10 is delivered from the factory 40 with the wireless charging control apparatus 13 mounted on the EV 10, a user of the EV 10 may visit a service center 50, and may download authentication information to the wireless charging control apparatus 13. At this time, the authentication information may be downloaded to the wireless charging control apparatus 13 in conjunction with a charging service provider 60 and the service center 50. More specifically, when information on the user is confirmed through the service center 50, the charging service provider 60 (i.e., a server corresponding to the charging service provider 60) may transmit the authentication information corresponding to the information on the user to the wireless charging control apparatus 13 via an On-Board Diagnostics apparatus (OBD). Here, the OBD may transmit and receive data to and from an Electric Control Unit (ECU) controlling various sensors of the EV 10 and the wireless charging control apparatus 13 via a gateway, and perform diagnostics and controls on various devices in the EV by identifying status information of the various devices.

The authentication information stored in the wireless charging control apparatus 13 may include identification information of the charging service provider 60, an identifier (ID) and a password of the user, and the like.

Meanwhile, the process of storing the authentication information in the wireless charging control apparatus 13 may be usually performed only once for the first time after the delivery of the EV 10. However, for example, when the charging service provider is changed, or the user is changed by buying or selling the EV 10, new authentication information may be stored in the wireless charging control apparatus 13.

As described above, in the case that the wireless charging control apparatus storing the authentication information and supporting the WiFi wireless communications is equipped in the EV 10, a wireless communication method for the WPT can be performed. For example, when the EV 10 enters a wireless charging area, the wireless charging control device 13 mounted on the EV 10 may search for nearby access points (APs) (which may be the charging station 20 according to FIG. 1). Then, the wireless charging control apparatus 13 may select among the searched APs an AP provided by the charging service provider 60 according to the authentication information, perform an association procedure to establish a wireless connection with the selected AP, and be assigned an IP address from the selected AP.

Therefore, using the wireless charging control apparatus 13 equipped in the EV 10 in accordance with embodiments of the present disclosure, even when there is no separate input device in the EV 10 (or, even when the user does not input the authentication information), a wireless communication association with the AP provided by the charging service provider 60 can be automatically performed.

Figure 5:
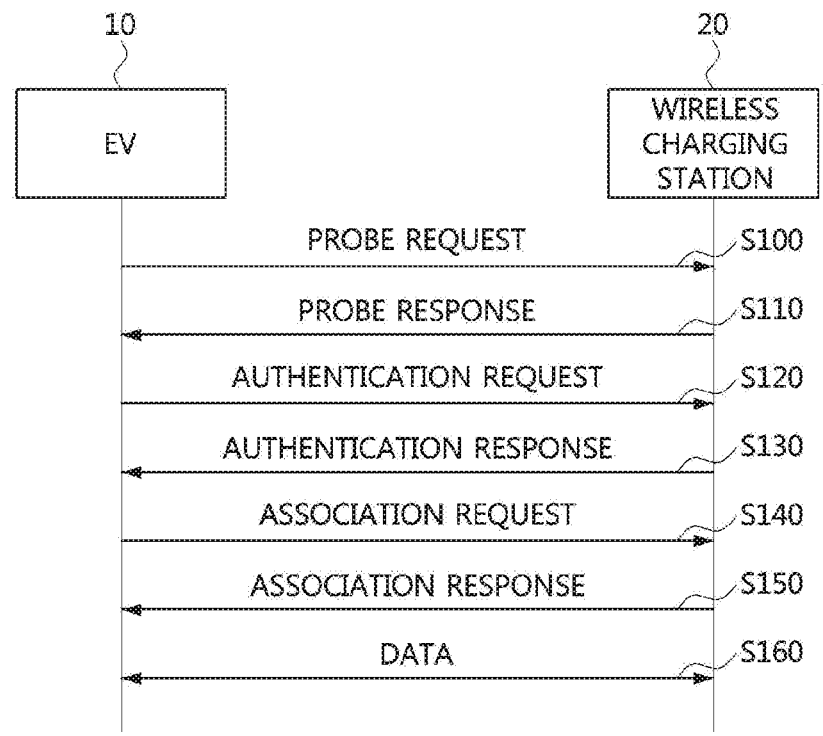
FIG. 5 is a first flowchart illustrating a wireless communication method for WPT to an EV according to embodiments of the present disclosure.

FIG. 5 is a first flowchart illustrating a wireless communication method for WPT to an EV according to embodiments of the present disclosure.

As shown in FIG. 5, the EV 10 may actively search for nearby APs based on an active scanning scheme, and perform an association procedure with a selected AP among the nearby APs.

First, the EV 10 (more specifically, the wireless charging control apparatus 13 of FIG. 4) may transmit a probe request frame including an SSID of the charging service provider corresponding to the authentication information (S100), and the charging station 20 (which may correspond to the selected AP) having an SSID identical to the SSID included in the probe request frame may transmit a probe response frame in response to the probe request frame (S1100).

The SSID of the wireless charging station 20 may be downloaded and stored in advance in the wireless charging control apparatus 13 via the OBD of the EV 10 at the service center after the EV is delivered.

Upon receiving the probe response frame from the charging station 20, the EV 10 may transmit an authentication request message requesting authentication for wireless connection initialization (i.e., WiFi access) of the charging station 20 (S120), and receive an authentication response frame from the charging station 20 in response to the authentication request frame (S130).

When the authentication between the EV 10 and the charging station 20 is completed, the EV 10 may transmit an association request frame requesting a wireless communication connection initialization to the charging station 20 (S140), and receive an association response frame permitting the wireless communication connection initialization from the charging station 20 (S150). Therefore, a wireless communication connection between the EV 10 and the charging station 20 can be established.

After the wireless communication connection is established, various data for WPT to the EV 10 may be exchanged between the EV 10 and the charging station 20 (S160).

Although it was described in the above that the EV (or the wireless charging control apparatus 13) actively searches for the nearby APs based on the active scanning scheme, a passive scanning scheme, in which the AP periodically transmits beacons, the EV receives the beacon, and the AP and the EV establish a wireless connection between them, may also be applied.

Figure 6:
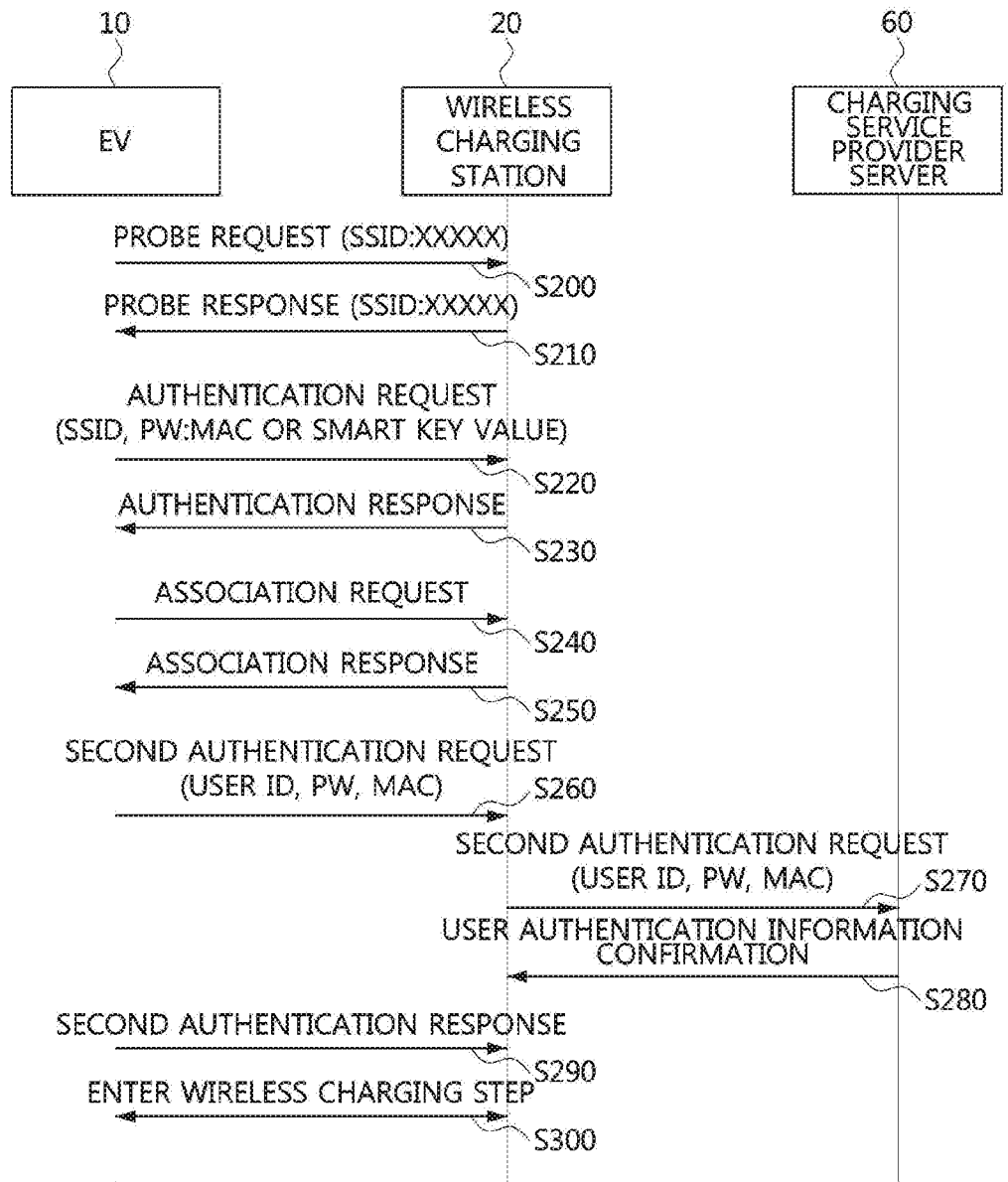
FIG. 6 is a second flow chart illustrating a wireless communication method for WPT to an EV according to embodiments of the present disclosure.

FIG. 6 is a second flow chart illustrating a wireless communication method for WPT to an EV according to embodiments of the present disclosure.

First, when the EV 10 enters a wireless charging area of the wireless charging station 20, alignment between a transmission pad of the EV 10 and a reception pad associated with the charging station 20 may be performed. A detailed description about the alignment is provided above with respect to FIG. 3.

When the alignment is completed, the wireless charging control apparatus in the EV 10 may be woken up. Then, according to the active scanning scheme, the wireless charging control apparatus 13 may transmit to the wireless charging station 20 a probe request frame including an SSID of the charging service provider pre-stored in the wireless charging control apparatus 13 (S200). Then, the charging station 20 having an SSID identical to the SSID included in the probe request frame may transmit a probe response frame to the EV 10 (S210).

When the transmission of the probe response frame is completed, an authentication procedure (steps S220 to S230) for wireless connection initialization and an association procedure (steps S240 to S250) for wireless connection initialization may be performed. Specifically, the EV 10 may transmit an authentication request frame for wireless connection initialization to the charging station 20 (S220), and receive an authentication response frame in response to the authentication request frame from the charging station 20 (S230). Here, the charging station 20 may verify whether password information and/or the SSID included in the authentication request frame match pre-stored values, and when it is determined that they match, the charging station 20 may transmit the authentication response frame to the EV 10.

Meanwhile, the authentication request frame may include the password information for wireless connection initialization (i.e., WiFi access). Here, a value generated by encrypting or altering a MAC address of the wireless charging control apparatus 13 shown in FIG. 4 (e.g., a value obtained by combining the MAC address and an arbitrary value) may be used as the password information. Alternatively, a value generated by altering a smart key signal of the EV may be used as the password information. The smart key signal of the EV or the altered signal of the smart key signal may be transmitted from a body control module (BCM) equipped in the EV to the wireless charging control apparatus 13 according to FIG. 4. Here, the BCM may be a device or a device and software for controlling operation of various units of a vehicle body including a wiper, a window, a trunk, a door, and the like of the vehicle, and may perform body control in cooperation with a smart key, and receive a smart key signal from the smart key.

Alternatively, in order to prevent duplicated connection of another user (or another EV), an authentication request message having contents corresponding to those of the authentication request frame may be transmitted from the reception pad of the EV 10 to the transmission pad of the charging station 20 in a magnetic communication manner instead of the WiFi communication.

When the authentication procedure (the steps S220 to S230) for wireless connection initialization is completed, the EV 10 may transmit an association request frame requesting a wireless communication connection initialization to the charging station 20 (S240), and receive an association response frame permitting the wireless communication connection initialization from the charging station 20 (S250).

When a wireless connection is established between the EV 10 and the charging station 20 through the steps S200 to S250, a user authentication procedure (steps S260 to S290) for WPT to the EV may be performed. First, the EV 10 may transmit to the charging station 20 a user authentication request message (alternatively referred to herein as "second authentication request") including user authentication information stored in advance of step S200 in the wireless charging control apparatus 13 shown in FIG. 4 (S260). Here, the user authentication information may include at least one of identification information (ID) of the user of the EV 10, a password, and a MAC address of the wireless charging control apparatus 13. The charging station 20 may transmit the received user authentication information to the charging service provider 60 (S270), and confirm validity of the user authentication information by receiving a user authentication confirmation message for the user authentication information from the charging service provider 60 (S280). When the validity of the customer authentication information is confirmed, the charging station 20 may transmit an authentication response message (referred to also as 'second authentication response') indicating completion of user authentication to the EV 10 (S290).

When the user authentication procedure (the steps S260 to S290) for the EV 10 is completed, the EV 10 and the charging station 20 may enter a wireless charging step S300, and various messages for the WPT process may be exchanged through the established wireless connection.

Figure 7:
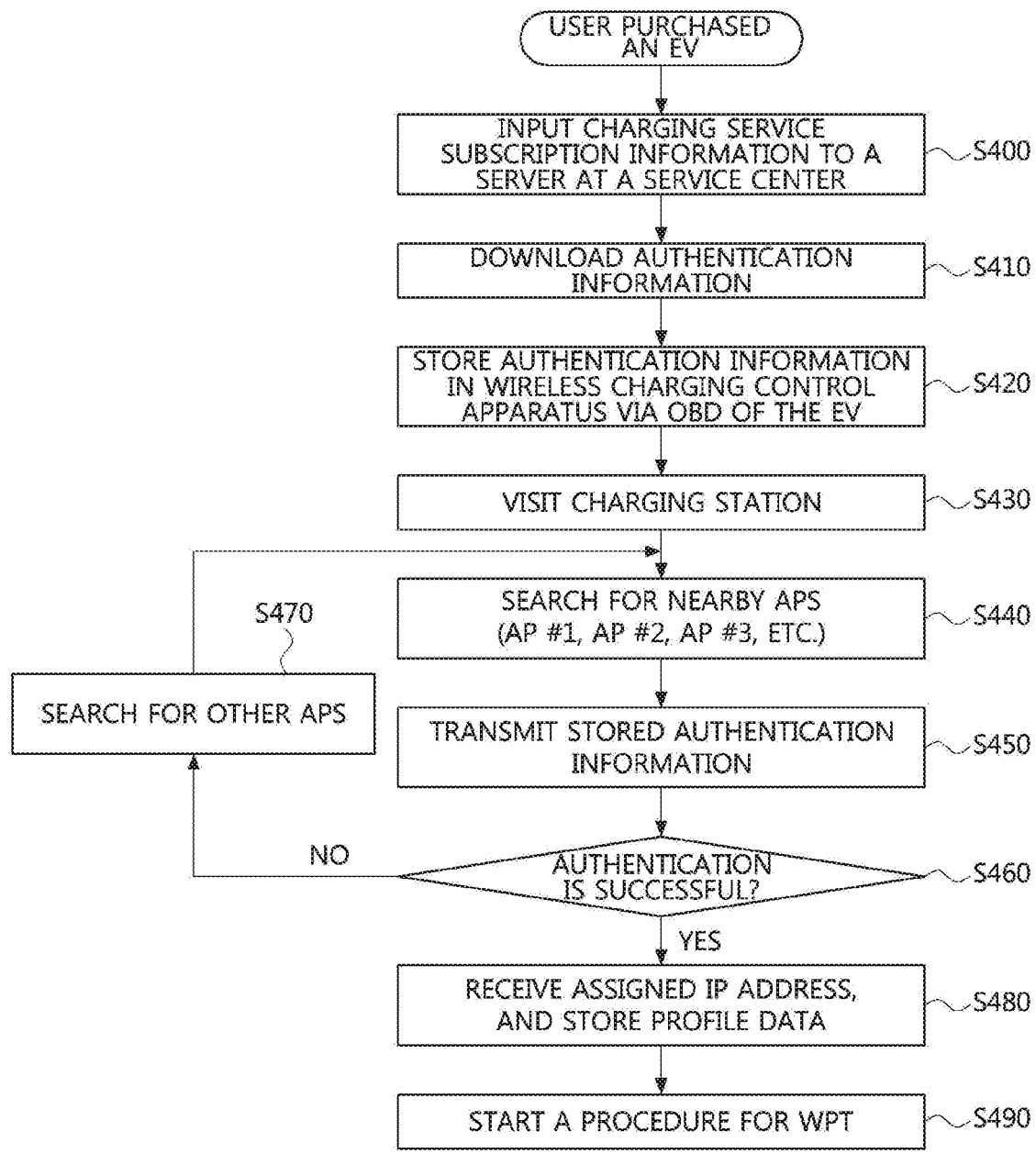
FIG. 7 is a flow chart illustrating a service scenario to which a wireless communication method according to embodiments of the present disclosure is applied.

FIG. 7 is a flow chart illustrating a service scenario to which a wireless communication method according to embodiments of the present disclosure is applied.

As shown in FIG. 7, when a user purchases an EV, charging service subscription information may be input to a server of the service center (S400). Herein, the charging service subscription information may include a user ID, a password, and the like for wireless charging of the EV. The server of the service center may register the user ID and the password in cooperation with a server of the charging service provider server, and download authentication information (including the user ID, the password, and identification information of the charging service provider) (S410). The server of the service center may store the downloaded authentication information in the wireless charging control apparatus through the OBD of the EV (S420). When the process of acquiring the authentication information through the steps S400 to S420 is completed, a wireless communication initialization for WPT to the EV may be performed automatically.

Specifically, when the EV enters a charging service area (S430), the wireless charging control apparatus previously installed in the EV may search for nearby APs (here, one AP among the nearby APs may correspond to the charging station) (S440). Then, the wireless charging control apparatus may transmit first authentication information for wireless connection initialization (e.g., SSID for the AP, password for wireless connection, etc.) to the searched AP (S450). At this time, the AP receiving the first authentication information may confirm validity of the first authentication information (S460). Here, when it is determined that the first authentication information is valid, the AP that has received the first authentication information may allocate an IP address to EV (S480), and may start a procedure for WPT to the EV (S490). When it is determined that the first authentication information is valid and the IP is assigned to the EV, the wireless charging control apparatus of the EV may store profile data including information for the communication connection with the AP. After that, if the EV enters the charging service area again, the wireless communication connection initialization can be performed directly to the AP corresponding to the stored profile data.

On the other hand, when it is determined the authentication information is not valid (e.g., when the searched AP is not an AP of the charging service provider stored in the first authentication information and thus the SSID of the searched AP is different from that of the AP of the charging service provided), and other APs excluding the searched AP may be searched and the authentication information may be transmitted to a newly-searched AP (S470).

Figure 8:
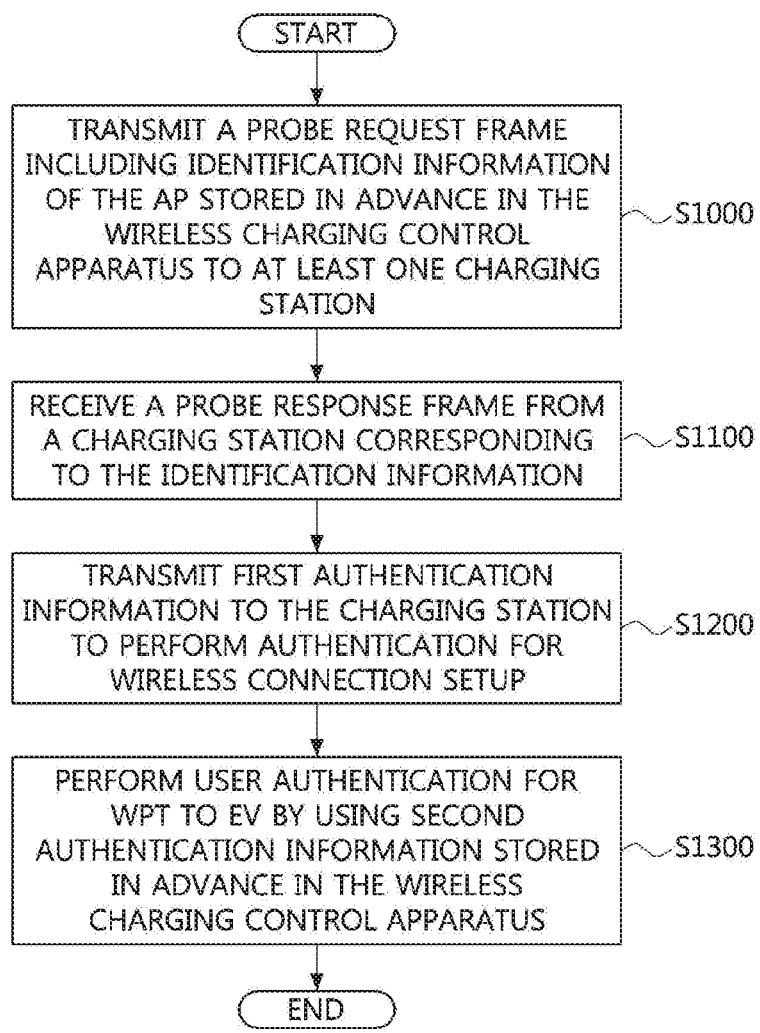
FIG. 8 is a simplified flow chart illustrating a wireless communication method for WTP to an EV according to embodiments of the present disclosure.

FIG. 8 is a simplified flow chart illustrating a wireless communication method for WTP to an EV according to embodiments of the present disclosure.

As shown in FIG. 8, a wireless communication method for WPT to an EV may comprise a step S1000 of transmitting a probe request frame including identification information of the AP (hereinafter, "AP identification information") stored in advance in the wireless charging control apparatus to at least one charging station, a step S110 of receiving a probe response frame from a charging station corresponding to the identification information, a step S1200 of performing authentication for wireless connection initialization by transmitting first authentication information (i.e., authentication information for authenticating wireless connection initialization) to the charging station, and a step S1300 of performing user authentication for EV WPT by using second authentication information (i.e., user authentication information for authorizing the user on WPT to the EV) stored in advance in the wireless charging control apparatus.

The wireless communication method for EV WPT may be performed in the wireless charging control apparatus equipped in an EV.

The method may further include, before the step S100 of transmitting the probe request frame, a step of detecting completion of alignment between the reception pad mounted on the EV and the transmission pad associated with the charging station.

The AP identification information may be a unique SSID of the AP provided by the charging service provider for the EV.

The wireless charging control apparatus may download and store the second authentication information from a server of the charging service provider in advance. Here, the second authentication information may include at least one of the ID and the password of the user of the EV 10, and a MAC address of the wireless charging control apparatus.

The step S1200 may further include a step of generating authentication password information based on a MAC address of the wireless charging control apparatus, and a step of transmitting an authentication request frame including the generated authentication password information to the charging station.

Alternatively, the step S1200 may further include a step of obtaining a smart key signal from a BCM of the EV, a step of generating the authentication password information by altering the obtained smart key signal, and a step of transmitting an authentication request frame including the generated authentication password information to the charging station.

Alternatively, the authentication password information may be transmitted to the charging station using a magnetic communication between a reception pad of the EV and a transmission pad controlled by the charging station.

The method may further include, when the user authentication is completed after the step S1300, a step of being assigned an IP address from the charging station. Also, the method may further include, after the step of being assigned the IP address, a step of generating and storing profile data including information for the communication connection initialization by the wireless charging control apparatus.

Figure 9:
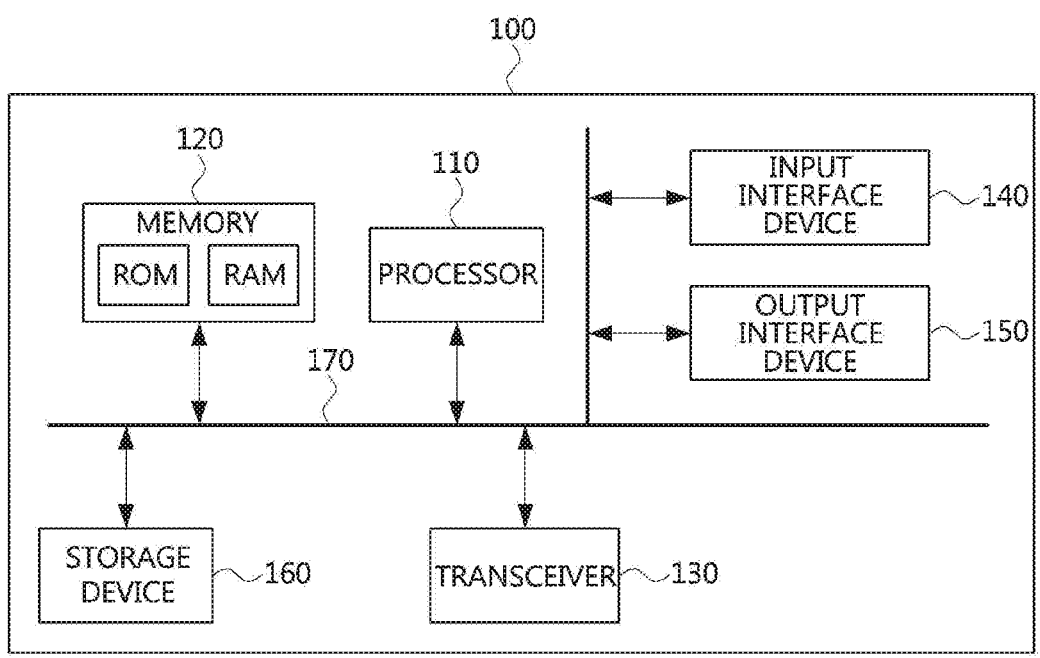
FIG. 9 is a block diagram illustrating a wireless charging control apparatus performing a wireless communication method for EV WPT according to embodiments of the present disclosure.

FIG. 9 is a block diagram illustrating a wireless charging control apparatus performing a wireless communication method for EV WPT according to embodiments of the present disclosure.

As shown in FIG. 9, a wireless charging control apparatus 100 may comprise at least one processor 110, and a memory 120 that stores instructions that direct the at least one processor 110 to perform at least one step.

Here, the at least one step may include a step of transmitting a probe request frame including identification information of the AP identification information stored in advance in the wireless charging control apparatus to at least one charging station, a step of receiving a probe response message from a charging station corresponding to the identification information, a step of performing authentication for wireless connection initialization by transmitting first authentication information (i.e., authentication information for authenticating wireless connection initialization) to the charging station, and a step of performing user authentication for EV WPT by using second authentication information (i.e., user authentication information for authorizing the user on WPT to the EV) stored in advance in the wireless charging control apparatus.

The at least one step may further include, before the step of transmitting the probe request frame, a step of detecting completion of alignment between the reception pad mounted on the EV and the transmission pad associated with the charging station.

The AP identification information may be a unique SSID of the AP provided by the charging service provider for the EV.

Also, the wireless charging control apparatus 100 may include an NVRAM storing the first authentication information and second authentication information downloaded from a server of the charging service provider.

The second authentication information may include at least one of the ID and the password of the user of the EV, and a MAC address of the wireless charging control apparatus.

The step of performing authentication for wireless connection initialization may further comprise a step of generating authentication password information based on a MAC address of the wireless charging control apparatus, and a step of transmitting an authentication request frame including the generated authentication password information to the charging station.

Alternatively, the step of performing authentication for wireless connection initialization may further comprise a step of obtaining a smart key signal from a BCM of the EV, a step of generating the authentication password information by altering the obtained smart key signal, and a step of transmitting an authentication request frame including the generated authentication password information to the charging station.

Alternatively, the authentication password information may be transmitted to the charging station using a magnetic communication between a reception pad of the EV and a transmission pad controlled by the charging station.

The at least one step may further comprise, when the user authentication is completed after the step of performing user authentication, a step of being assigned an IP address from the charging station. Also, the at least one step may further comprise, after the step of being assigned the IP address, a step of generating and storing profile data including information for the communication connection initialization by the wireless charging control apparatus.

The at least one processor 110 may be a central processing unit (CPU), a graphics processing unit (GPU), or a dedicated processor on which methods in accordance with embodiments of the present disclosure are performed. Each of the memory 120 and the storage device 160 may be constituted of at least one of a volatile storage medium and a non-volatile storage medium. For example, the memory 120 may comprise at least one of a read only memory (ROM) and a random access memory (RAM).

Also, the wireless charging control apparatus 100 may further comprise a transceiver 130 for performing wireless communications. Also, the apparatus 100 may further comprise an input interface device 140, an output interface device 150, and the like. The respective components included in the apparatus 100 may perform communications with each other by being connected via a common bus 170 or a dedicated signal line.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for an exemplary embodiment of the present disclosure or can be publicly known and available to those who are skilled in the field of computer software.

Examples of the computer readable medium may include a hardware device including ROM, RAM, and flash memory, which are configured to store and execute the program instructions. Examples of the program instructions include machine codes made by, for example, a compiler, as well as high-level language codes executable by a computer, using an interpreter. The above exemplary hardware device can be configured to operate as at least one software module to perform the operation of the present disclosure, and vice versa.

While some aspects of the present disclosure have been described in the context of an apparatus, it may also represent a description according to a corresponding method, wherein the block or apparatus corresponds to a method step or a feature of the method step. Similarly, aspects described in the context of a method may also be represented by features of the corresponding block or item or corresponding device. Some or all of the method steps may be performed by (or using) a hardware device such as, for example, a microprocessor, a programmable computer, or an electronic circuit. In various exemplary embodiments, one or more of the most important method steps may be performed by such an apparatus.

In embodiments, a programmable logic device (e.g., a field programmable gate array (FPGA)) may be used to perform some or all of the functions of the methods described herein. In embodiments, the FPGA may operate in conjunction with a microprocessor to perform one of the methods described herein. Generally, the methods are preferably performed by some hardware device.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teachings. The embodiments were chosen and described to explain certain principles of the disclosure and their practical application, to enable others skilled in the art to make and utilize various embodiments of the present disclosure, as well as various alternatives and modifications thereof. It is intended that the scope of the disclosure be defined by the claims appended hereto and their equivalents.

What is claimed is:

1. A wireless communication method for wireless power transfer (WPT) to an electric vehicle (EV), the wireless communication method comprising:
    transmitting, by a wireless charging control apparatus equipped in the EV, a probe request frame to a charging station, the probe request frame including identification information of an access point (AP) pre-stored in the wireless charging control apparatus;
    receiving, at the wireless charging control apparatus, a probe response frame from the charging station corresponding to the identification information;
    performing, by the wireless charging control apparatus, authentication for wireless connection initialization by transmitting first authentication information to the charging station;
    after the authentication for the wireless connection initialization is completed, performing, by the wireless charging control apparatus, user authentication for WPT using second authentication information pre-stored in the wireless charging control apparatus, and
    after the performing of the user authentication, the wireless charging control apparatus is assigned an Internet Protocol (IP) address by the charging station.

2. The wireless communication method according to claim 1, further comprising, before the transmitting of the probe request frame, detecting, by the wireless charging control apparatus, completion of alignment between a reception pad equipped in the EV and a transmission pad operatively coupled to the charging station.

3. The wireless communication method according to claim 1, wherein the identification information of the AP is a unique service set identifier (SSID) of an AP provided by a charging service provider for the EV.

4. The wireless communication method according to claim 1, further comprising downloading and storing, by the wireless charging control apparatus, the second authentication information from a server of a charging service provider prior to the transmitting of the probe request frame.

5. The wireless communication method according to claim 4, wherein the second authentication information includes at least one of an identification (ID) of a user of the EV, a password of the user of the EV, and a medium access control (MAC) address of the wireless charging control apparatus.

6. The wireless communication method according to claim 1, wherein the performing of the authentication for the wireless connection initialization comprises:
    generating, by the wireless charging control apparatus, authentication password information based on a MAC address of the wireless charging control apparatus; and
    transmitting, by the wireless charging control apparatus, an authentication request frame including the generated authentication password information to the charging station.

7. The wireless communication method according to claim 1, wherein the performing of the authentication for the wireless connection initialization comprises:
    obtaining, by the wireless charging control apparatus, a smart key signal from a body control module of the EV;
    generating, by the wireless charging control apparatus, authentication password information by altering the obtained smart key signal; and
    transmitting, by the wireless charging control apparatus, an authentication request frame to the charging station, the authentication request frame including the generated authentication password information.

8. The wireless communication method according to claim 1, further comprising, after being assigned the IP address, generating and storing, by the wireless charging control apparatus, profile data including information for the wireless connection initialization.

9. The wireless communication method according to claim 1, wherein the performing of the authentication for the wireless connection initialization comprises transmitting, by a reception pad of the EV, an authentication request message to a transmission pad of the charging station in a magnetic communication manner, the authentication request message including the first authentication information.

10. A wireless charging control apparatus equipped in an electric vehicle (EV) comprising at least one processor and a memory storing at least one program instruction, which when executed by the at least one processor causes the at least one processor to be configured to:
    transmit, to a charging station, a probe request frame including identification information of an access point (AP) pre-stored in the wireless charging control apparatus;
    receive a probe response frame from the charging station corresponding to the identification information;
    perform authentication for wireless connection initialization by transmitting first authentication information to the charging station; and
    after the authentication for the wireless connection initialization is completed, perform user authentication for wireless power transfer (WPT) using second authentication information pre-stored in the wireless charging control apparatus,
    wherein the wireless charging control apparatus is assigned an Internet Protocol (IP) address by the charging station after the performance of the user authentication.

11. The wireless charging control apparatus according to claim 10, wherein the at least one processor is further configured to, before the transmission of the probe request frame, detect completion of alignment between a reception pad equipped in the EV and a transmission pad operatively coupled to the charging station.

12. The wireless charging control apparatus according to claim 10, wherein the identification information of the AP is a unique service set identifier (SSID) of an AP provided by a charging service provider for the EV.

13. The wireless charging control apparatus according to claim 10, further comprising a non-volatile memory (NVRAM),
    wherein the at least one processor is further configured to download the second authentication information from a server of a charging service provider prior to the transmission of the probe request frame, and the NVRAM is configured to store the second authentication information prior to the transmission of the probe request frame.

14. The wireless charging control apparatus according to claim 13, wherein the second authentication information includes at least one of an identification (ID) of a user of the EV, a password of the user of the EV, and a medium access control (MAC) address of the wireless charging control apparatus.

15. The wireless charging control apparatus according to claim 10, wherein the at least one processor is further configured to:
    generate authentication password information based on a MAC address of the wireless charging control apparatus; and
    transmit an authentication request frame including the generated authentication password information to the charging station.

16. The wireless charging control apparatus according to claim 10, wherein the at least one instruction is further configured to:
    obtain a smart key signal from a body control module of the EV;
    generate authentication password information by altering the obtained smart key signal; and
    transmit an authentication request frame to the charging station, the authentication request frame including the generated authentication password information.

17. The wireless charging control apparatus according to claim 10, wherein the at least one processor is further configured to, after the wireless charging control apparatus being assigned the IP address, generate and store profile data including information for the wireless connection initialization.

18. The wireless charging control apparatus according to claim 10, wherein a reception pad of the EV transmits an authentication request message to a transmission pad of the charging station in a magnetic communication manner, the authentication request message including the first authentication information.

* * * * *